Jan. 6, 1953 P. H. BILLS ET AL 2,624,491
SUBMERGED SOLENOID OPERATED PUMP
Filed May 4, 1950 2 SHEETS—SHEET 2

INVENTORS
PHILIP H. BILLS, JOSEPH A. LOGAN
AND THEODORE J. MESH
BY Chapin & Neal
ATTORNEYS Patented Jan. 6, 1953

2,624,491

UNITED STATES PATENT OFFICE 2,624,491

SUBMERGED SOLENOID OPERATED PUMP

Philip H. Bills, Longmeadow, Joseph A. Logan, Hadley, and Theodore J. Mesh, Easthampton, Mass., assignors to Gilbert & Barker Manufacturing Company, West Springfield, Mass., a corporation of Massachusetts Application May 4, 1950, Serial No. 159,904

2 Claims. (Cl. 222—146)

This invention relates to improvements in lubricant-serving apparatus, such for example, as may be effectively used in the servicing of automotive vehicles for the purpose of forcing lubricant from a container under high pressure to the various grease fittings of the vehicle.

The invention has for one object the provision, in an apparatus of the class described, of an electromagnetically-operated reciprocating-piston pump adapted to be immersed in the lubricant in a lubricant container so that the heat produced by energization of the electromagnets, may be utilized to warm the grease in the container and facilitate flow of such grease into the pump.

The invention has for another object the provision, in an apparatus of the class described, of a casing, containing the electromagnets and pump, with a conduit for the electrical supply wires for the electromagnets and a delivery conduit receiving the discharge from the pump, both conduits being fixed to the casing and extending upwardly far enough to pass out of the lubricant container, when the pump is immersed in the lubricant in such container, at least one such conduit preferably being rigid, whereby it may be used as a handle to plunge the casing into and through lubricant in the container or to lift the casing out of the container.

Another object of the invention is to provide, in an apparatus of the class described, a pressure-limiting safety control for stopping the pump, whenever the lubricant has been placed under a selected predetermined pressure.

A further object of the invention is to provide, in apparatus of the class described, means for automatically opening the circuit to the electromagnets of the pump to stop the latter, whenever the operator hangs up the dispensing hose.

A further object of the invention is to provide, in apparatus of the class described, provisions for temporarily preventing the pressure-limiting means from functioning to stop the pump, so that the pump may be operated to produce pressures higher than the selected predetermined pressure for a short period, as for example, for the purpose of opening a plugged passage in a lubrication fitting on the automotive vehicle being serviced.

A further object of the invention is to provide, in an apparatus of the class described, means for temporarily preventing the pressure-limiting means from functioning to open the circuit to the electromagnets of the pump so that heat from the electromagnets can be utilized to warm the lubricant in the container prior to servicing work, as for example in starting up in cold weather, and before the nozzle of the dispensing hose is opened.

These and other objects will more particularly appear from the following description of one illustrative example of the invention and detailed variations thereof, in the accompanying drawings, in which:

Figs. 5 and 6 are fragmentary sectional plan and sectional elevational views, respectively, showing a modification; and Fig. 7 is a view taken similarly to Fig. 5 and showing another modification.

Figure 1:
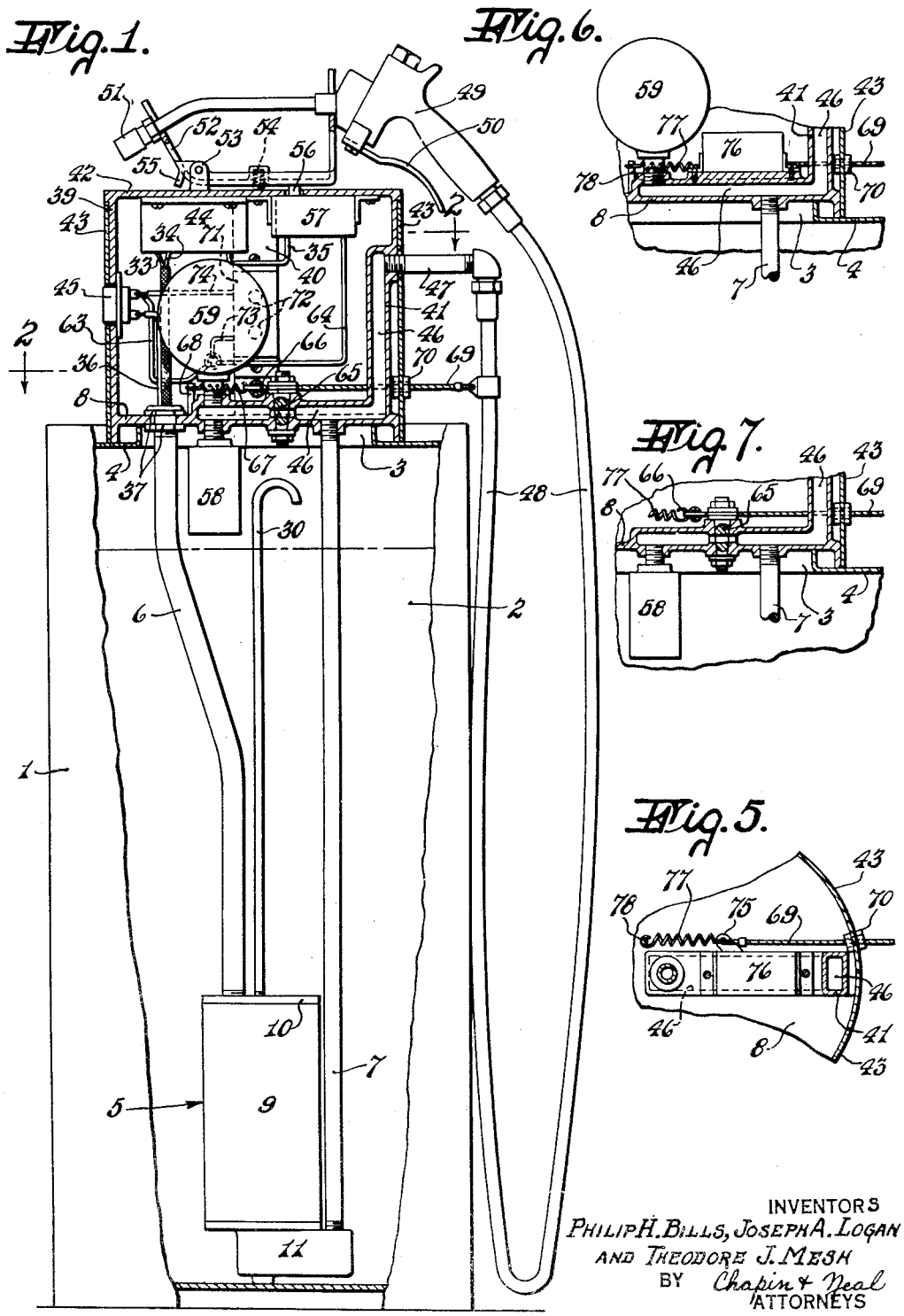
Fig. 1 is a sectional elevational view of a lubricant serving apparatus, embodying the invention, shown in operative position in a lubricant container.

Referring to these drawings, and first to Fig. 1 thereof, there is shown a container 1, adapted to contain lubricant 2, and having an opening 3 in its top wall 4, through which opening the lubricant-serving apparatus of this invention may be inserted into the container and immersed in the lubricant contained therein. The particular container shown is a drum, adapted to contain grease, such for example, as that used for servicing the grease fittings of an automobile. This particular drum has a relatively-small central cover, which is removed to provide the opening described. However, the size, shape and location of the opening in grease drums vary widely, and in some cases even the entire top wall is removable, and the invention is generally applicable to all such drums and not limited to the one particular form shown.

The lubricant-dispensing pump is contained in a casing 5, which is suspended by at least one, and preferably both, of a pair of conduits 6 and 7 from a suitable supporting member 8. This support is adapted to overlie the opening 3 in the lubricant container 1. It will vary according to circumstances. In some cases, the supporting member may rest directly on the top 4 of the container as shown. In other cases the supporting member may be otherwise supported and merely overlie the opening, particularly where the lubricant container is placed inside a cabinet, which frequently has slidably mounted grease-pump-supporting members adapted to be raised and lowered. As herein shown, the support 8, with the casing 5 suspended therefrom, is manually raised and lowered without any guiding means provided for the purpose. It is first raised high enough to position the casing 5 above opening 3 and then lowered to allow the casing to sink in the grease or be thrust therein if necessary. The casing is positioned in the bottom of the container 1 and the support 8 then rests on top of the wall 4 of the container. The conduits 6 and 7 are respectively for electrical wires and the discharge of lubricant. They are shown as rigid conduits, each suitably fixed at its upper and lower ends to the supporting member 8 and casing 5, respectively, although this is not necessarily essential in all cases.

Figure 3:
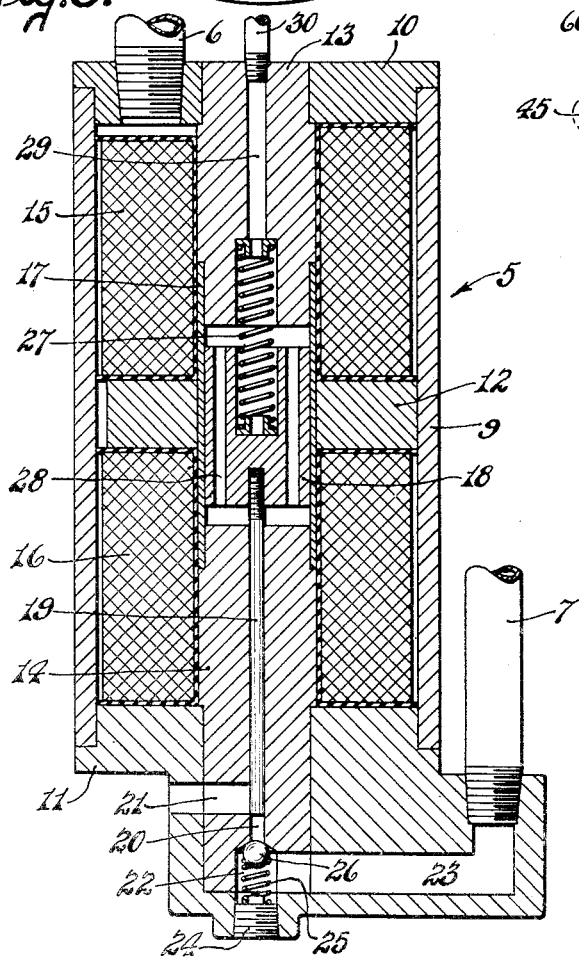
Fig. 3 is a sectional elevational view of the electromagnetically-actuated reciprocating-piston pump drawn to a larger scale.

The pump is of the electromagnetically-operated, reciprocating-piston type. It is shown in detail in Fig. 3. The casing 5 includes a hollow cylindrical shell 9 and upper and lower heads 10 and 11, respectively fixed in and closing the upper and lower ends of the shell. Fixed in the shell 9 midway between the heads is an annular ring 12. Fixed centrally to the heads 10 and 11 are cores 13 and 14, respectively, which extend coaxially of shell 9 toward one another and toward ring 12 but terminate short of such ring. Mounted on cores 13 and 14 are solenoid coils 15 and 16, respectively, which fill the space between ring 12 and the upper and lower heads respectively. The shell 9, heads 10 and 11, ring 12 and cores 13 and 14 are of any suitable magnetic material. A tube 17, of non-magnetic material, tightly fits at its ends on the cores 13 and 14 and spans the space between them. An armature 18 of magnetic material is slidably mounted in and guided by tube 17. Fixed at one end to armature 18 is a piston rod 19, which is slidably mounted in core 14 and has its lower end extending into a pump cylinder 20, formed in the lower end of core 14. The lower end of core 14 fits into a seat in head 11. In this head and core, an inlet passage 21 is provided to connect the upper end of cylinder 20 with the interior of container 1. Outlet passages 22 and 23 are also provided in core 14 and head 11. The lower end of passage 22 is closed by a plug 24, which also serves as a seat for a spring 25, tending to hold closed a ball outlet valve 26 in the upper end of passage 22. The delivery conduit 7 is threaded into the head 11 and communicates with the outer end of passage 23, the inner end of which communicates with passage 22. A spring 27, housed in part in core 13 and in part in armature 18, tends to hold the armature in its mid position, as shown, and piston 19 midway in its stroke in cylinder 20.

The armature 18 has openings 28 therethrough to allow free passage of fluid from one end to the other. In the event that grease should leak past the piston and enter the space within tube 17, it can pass through the holes 28 in the armature and into a vent passage 29 in core 13. This passage is connected to a suitable vent pipe 30, which extends upwardly in the lubricant container as shown in Fig. 1.

Figure 4:
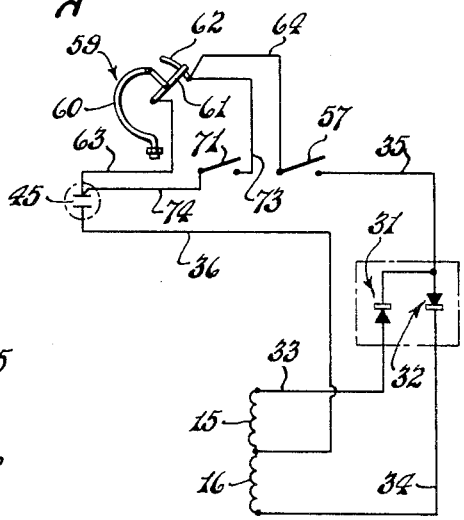
Fig. 4 is a wiring diagram showing the electrical connections of the apparatus.

The solenoid coils 15 and 16 are connected to an alternating current supply circuit, say for example, to a 110 volt, 60 cycle supply, through suitable rectifiers 31 and 32, as shown in Fig. 4, so that the solenoids are alternately energized. Thus, the armature 18 and piston 19 may be reciprocated at the frequency of the alternating current, as 3600 times a minute. One terminal of coil 15 is connected by a wire 33 to one terminal of rectifier 31 and one terminal of coil 16 is connected by a wire 34 to one terminal of rectifier 32. The other terminals of both rectifiers are connected together and to a wire 35, which is adapted for connection, through suitable switches to be later described, to one side of the alternating current supply. The other side of such supply is connected by a wire 36 to the other terminals of both coils 15 and 16.

Figure 2:
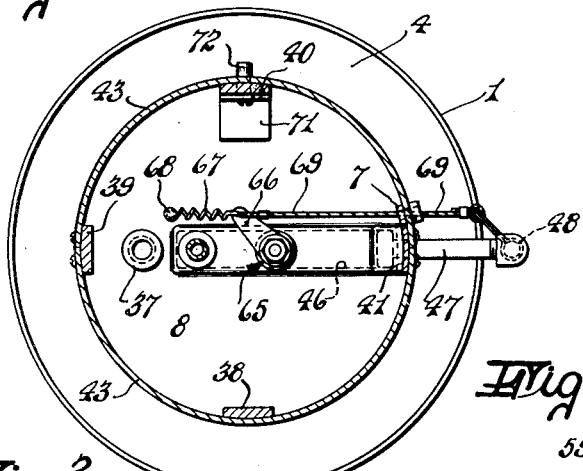
Fig. 2 is a sectional plan view taken on the line 2—2 of Fig. 1.

The wires 33, 34 and 36 extend through the conduit 6, the upper end of which extends through support 8 and is suitably fastened thereto, as by nuts 37. The support 8, as shown in Fig. 2, is circular. From it upstand four posts 38, 39, 40 and 41 to the upper ends of which are integrally connected another circular member 42. Two semi-cylindrical sheet-metal casing parts 43, secured to posts 39 and 41, enclose the space between the members 8 and 42. The rectifiers 31 and 32 are contained in a case 44 which may be secured to the bottom of member 42. The post 39 supports a receptacle 45, into which a suitable plug, connected to the alternating current source, may be inserted.

The member 8, in the particular form herein shown, has a cored passage 46 therein, to which the upper end of delivery conduit 7 is connected. This passage extends horizontally to the left and right of its junction with conduit 7 and its right hand branch extends upwardly in post 41, connecting with the inner end of a rigid horizontally-disposed outlet pipe 47, to the outer end of which one end of a flexible hose 48 is connected. The other end of hose 48 carries a suitable nozzle 49, having the usual valve, which is spring-closed and can be opened by manual pressure on a lever 50. The outlet end of nozzle 49 carries a suitable coupling 51 for engagement with the grease fittings on the automotive vehicle.

The nozzle 49 may be supported, when not in use, by a support 52 which is pivoted at 53 to lugs on member 42. A spring 54 tends to swing the support 52 counterclockwise as far as permitted by the engagement of a stop 55 with member 42. The nozzle 49, when placed on support 52, swings the latter clockwise into the illustrated position, thereby depressing the button 56 of a switch 57 to open the same. This switch is of the type, which is closed except when its button 56 is depressed. Consequently, when the operator lifts the nozzle 49 from support 52, switch 57 will automatically close. This switch is indicated in the diagram of Fig. 4.

The left hand branch of the cored passage 46 is connected to a suitable pressure-relief valve 58, which may be set to open at some suitable predetermined maximum pressure, say for example, 5000 p. s. i. Such branch is also connected to a suitable switch 59, which is normally closed but which opens in response to said predetermined pressure. This switch may, for example, be of the Bourdon tube type, as indicated in Fig. 4. The Bourdon tube 60 swings to the left in response to increase in grease pressure and moves a finger 61 over a contact 62. When the selected predetermined pressure is reached, the finger 61 will move off the left hand end of the contact 62 and thus open. A supply wire 63 leads from receptacle 45 to finger 61 and a wire 64 connects contact 62 to one terminal of switch 57, the other terminal of which is connected to wire 35.

Interposed in the passage 46 between conduit 7 and the pressure-safety devices 58 and 59 is a valve 65, which is normally open as shown. If this valve is closed, then the pressure-safety devices will be prevented from acting in response to grease pressure. This may at times be desirable for short periods, as for example, when a plugged grease fitting is encountered and it is desired to apply to such fitting pressures in excess of the above-named predetermined pressure. The valve 65 has an actuating lever 66 (Fig. 2) and a spring 67, which connects this lever to a pin 68 on member 8, holds the valve in open position. The lever 66 is connected by a flexible wire 69 to the hose 48. This wire passes through a grommet 70 in casing 43 so that if the operator pulls on the hose either forwardly or to the right or left, the wire will be pulled to close valve 65 and thus enable higher pressure to be secured for the purpose described. However, the operator must maintain a pull on the hose to get the higher pressure and as soon as he relaxes his pull, valve 65 opens.

In Figs. 1 and 2, there has been indicated a switch 71, mounted on post 40 with its actuating push buttons 72 projecting through the post and outside the casing 43. This switch is provided so that the operator may disable the pressure-limiting devices, when it is desired to warm up the grease in container 1 preliminary to a servicing operation of the pump. This switch, as will be clear from Fig. 4, is bridged across the terminals of the pressure-limiting switch 61 as by having its terminals respectively connected by wires 73 and 74 to the wires 64 and 63. Thus, if on a cold morning, the grease 2 in container 1 needs warming up, before the apparatus is used for automotive servicing, the operator may press on one of the buttons 72 to close switch 71 and then, as soon as he lifts the nozzle 49 from its movable support 52, the solenoids 15 and 16 will be energized and the heat therefrom will warm the grease. Of course, if a relief valve 58 is provided, as shown, it will open as soon as the pressure limit has been reached, and the pump will operate, causing grease to flow out into the container. If this valve is omitted, as it may be as shown in Fig. 6, and sole reliance is placed on the pressure-limiting switch 59, then the pump will not operate because there is no outlet for the grease and the pump piston will stall at whatever pressure can be produced by the power applied to the solenoid coils. However, the heat from these coils will be utilized to warm the grease and facilitate flow thereof into the inlet of the pump. As soon as the grease has been warmed sufficiently, the other button 72 of switch 71 may be pressed to open the switch and thus open the shunt around the pressure-limiting switch 61, allowing the latter again to be operative.

Figs. 5 and 6 illustrate a modification. The pressure relief valve 58 and the disabling valve 65 have been omitted. The pressure switch 59 has been retained and this is arranged to be disabled by pulling on the hose 48, the wire 69 operating the arm 75 of a switch 76. This arm 75 is connected by a spring 77 to a pin 78 on support 8 and this spring tends to hold arm 75 in the position in which the switch is open. However, a pull on hose 48 will close switch 76 and this switch, which is connected in the circuit in the same way as the described switch 71, will close a shunt around the pressure switch and prevent the same from opening at the selected predetermined pressure.

Fig. 7 shows another modification in which the pressure relief valve 58 is used and the pressure switch 59 is omitted. The valve 65 is employed, as before, being actuated by a pull on hose 48 to closed position so that valve 58 is cut off from the pump, whereby the pump may produce pressures above the selected predetermined pressure at which valve 58 is set to open, up to the pressure at which the pump stalls.

The operation will be clear from the foregoing description. The solenoid coils will be energized by the removal of nozzle 49 from its support. If a relief valve, such as 58, is employed, that will open at the selected predetermined pressure and the pump will operate, by-passing grease until the valve in the grease nozzle 49 is opened. If the relief valve is not employed, the switch 59 will immediately open and the apparatus will be stopped until the operator opens the valve in the grease nozzle. However, the solenoid coils may be kept in circuit to initially warm the grease before servicing, by closing switch 71, or if desired by closing the equivalent switch 76 by pulling on the hose. Servicing is effected in the usual way, the operator pressing the coupling 51 against the fitting to be serviced of the automotive vehicle and then opening the nozzle valve by pressure on lever 50. Operation of the pump then ensues to dispense grease until this valve is closed. Then, the pump may stop if no relief valve is provided or if such a valve is provided, the pump may continue to operate by by-passing the pumped grease back into the container 1. In case, during servicing, it is necessary for the pump to produce a pressure greater than that at which the pressure-limiting devices are set to operate, this can be effected by pulling on the hose which will temporarily disable such devices.

The solenoids of the pump, whenever energized, function to raise the temperature of the grease and thus lower its viscosity, whereby flow of the grease into the inlet of the pump is facilitated. While the heat exchange between the solenoids and grease is most useful in warming up the grease preliminary to grease servicing work, the heat exchange is effective, whenever the solenoids are energized, and is always useful.

The solenoid-operated pump produces an impact upon each body of grease drawn into the cylinder. These impacts occur at high frequency and the desirable high pressures for grease servicing can be readily obtained.

Thus, we have provided an improved lubricant-serving apparatus desirable for use in servicing the grease fittings of automotive vehicles. Such apparatus is characterized by an electromagnetically-operated reciprocating piston pump adapted to be immersed in the lubricant and effective to produce the high pressures required for the type of work described and to effect a desirable heat exchange with the lubricant. The invention also provides operating and safety controls desirable and useful in an apparatus of the type described.

What is claimed is:

1. In a lubricant serving apparatus, a casing comprising a tube and upper and lower heads closing the ends of the tube, upper and lower cores in the tube coaxial therewith and fixed one to each head, said cores extending toward one another but terminating with their adjacent ends in axially-spaced relation, upper and lower solenoids respectively mounted on the upper and lower cores and each longer than its core, an annular ring between the adjacent ends of the two solenoids and engaging the inner wall of the tube, there being a chamber between the adjacent ends of the two cores and within the inner peripheries of the ring and solenoids, an armature reciprocable in said chamber having passages connecting opposite ends; said tube, heads, cores, ring and armature being of magnetic material; the upper core having a passage therethrough extending from end to end thereof, a rigid member secured to the casing and extending upwardly a substantial distance above the upper head, said casing adapted to be thrust by said member into and through lubricant in a container and positioned with its axis substantially vertical and its lower head near the bottom of the container, a vent pipe connected to the upper end of the upper core and with the passage therein and extending upwardly far enough to reach the top of the container, a foot on the lower head having therein a cylinder coaxial with the armature and inlet and outlet passages at the upper and lower ends of the cylinder, and a valve in said outlet passage, said inlet passage being valveless and adapted to communicate directly with the container at a location closely adjacent said lower head, whereby to receive lubricant warmed by heat radiated from said solenoids and flowing downwardly along the periphery of said casing.

2. A grease dispensing apparatus, comprising, a casing consisting of a tube and heads closing opposite ends of the tube, a solenoid in said casing having ends engaging one with each head, an armature for the solenoid located coaxially of said tube, a rigid member of substantial length connected at one end to one head of the casing and extending away from the same in a direction substantially parallel to the axis of said tube, said casing adapted to be thrust by means of said member downwardly into and through grease in a grease container to position the casing in the latter with the axis of the tube substantially vertical and with the lower head near the bottom of the container, a short extension from the outer face of the lower head extending downwardly close to the bottom of the container and having therein a cylinder located coaxially of said tube and solenoid, a piston in said cylinder connected to said armature to be reciprocated thereby, said extension having inlet and outlet passages for the cylinder, an outlet valve in the outlet passage, said inlet passage extending through said extension radially of said cylinder with its entrance located immediately below the outer face of said lower head and spaced inwardly from the outer periphery of the head a substantial distance, whereby grease in contact with the outer face of the lower head may be warmed by heat from the solenoid conducted through the lower head to render the grease at the entrance of said inlet passage fluent enough to flow by gravity into said inlet.

PHILIP H. BILLS.
JOSEPH A. LOGAN.
THEODORE J. MESH.

REFERENCES CITED

The following references are of record in the file of this patent:

UNITED STATES PATENTS

| Number | Name | Date |
|---|---|---|
| 1,700,471 | Davis | Jan. 29, 1929 |
| 1,743,236 | Redmond | Jan. 14, 1930 |
| 1,775,411 | Stedwell | Sept. 9, 1930 |
| 1,871,989 | Heitger | Aug. 16, 1932 |
| 1,975,311 | Creveling | Oct. 2, 1934 |
| 1,990,742 | Marvel | Feb. 12, 1935 |
| 2,279,650 | Wood | Apr. 14, 1942 |
| 2,319,934 | Korte | May 25, 1943 |
| 2,381,650 | Dick | Aug. 7, 1945 |

FOREIGN PATENTS

| Number | Country | Date |
|---|---|---|
| 375,291 | Great Britain | June 21, 1932 |